W. ELLMAKER & C. HURST.
Carriarge Brake.
No. 35,016. Patented April 22, 1862.
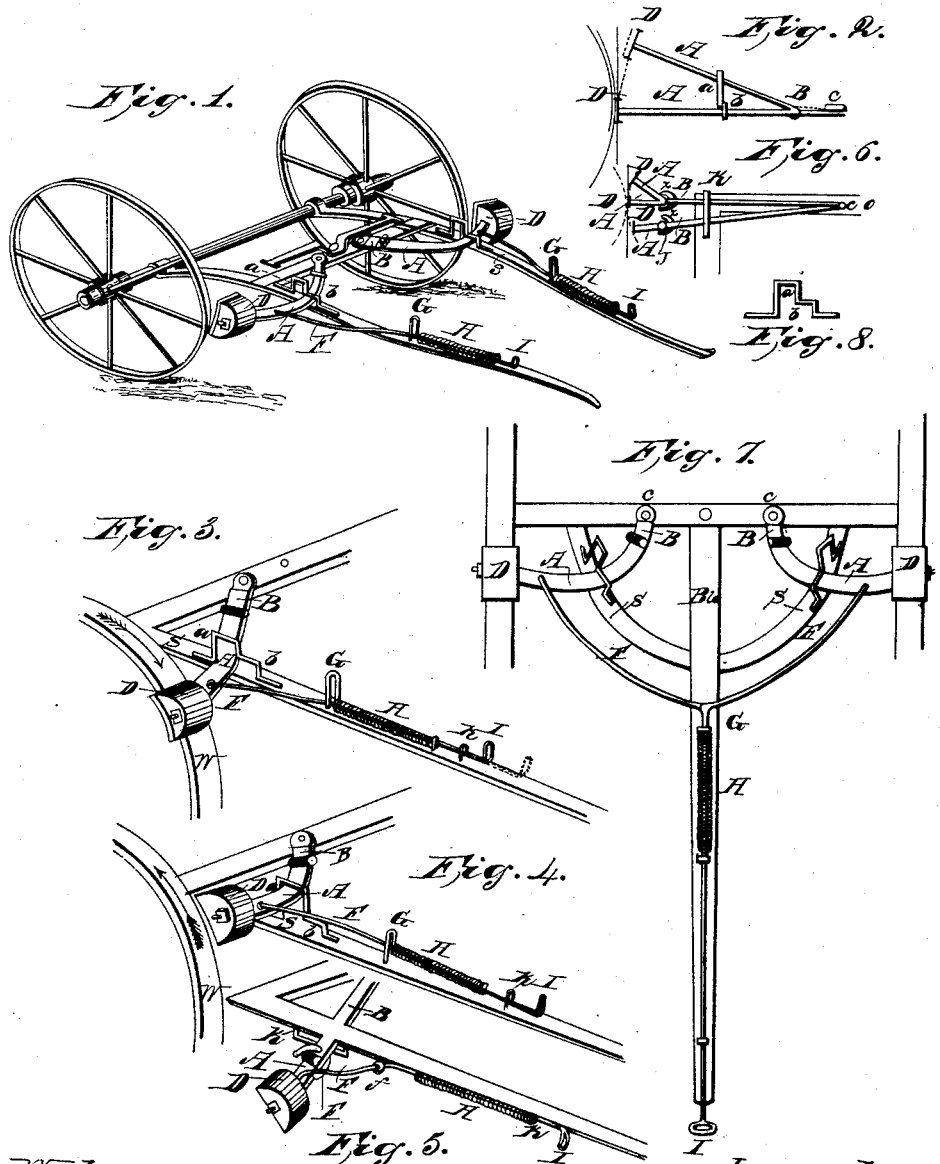

UNITED STATES PATENT OFFICE.

WILLIAM ELLMAKER AND CHRISTIAN HURST, OF EARL, LANCASTER COUNTY, PENNSYLVANIA.

IMPROVEMENT IN CARRIAGE-BRAKES.

Specification forming part of Letters Patent No. 35,016, dated April 22, 1862.

*To all whom it may concern:*

Be it known that we, WILLIAM ELLMAKER and CHRISTIAN HURST, of Earl township, in the county of Lancaster and State of Pennsylvania, have jointly invented new and useful Improvements on Self-Acting Brakes for Carriages; and we do hereby declare that the following is a full and exact description thereof, reference being had to the accompanying drawings, making a part of this specification, in which—

Figure 1 shows the improvement in place in its relative position. Fig. 2 illustrates the change or action of the rubber on the jointed lever confined in the step-staple. (Shown by Fig. 8.) Fig. 3 shows the rubber and lever when on the lock, the motion of the wheel being forward, or its action on the rubber D in the direction of the arrow, keeping the lever down on the shaft. Fig. 4 shows the rubber D raised on its jointed arm A in the upper step, $a$, of the staple by the retrograde movement of the wheel in backing, and thus the block D is held clear from the wheel. Fig. 5 shows a joint in the rod F when it is desirable to apply the arrangement of the spring under the shafts or pole, in which case the joint in the lever is placed outside of the shaft, and a check-hook, $x$, is placed behind the joint, so as to prevent the rubber from being thrown beyond its own gravitating force and cause it to drop in place by its own weight. When the action of backing is arrested or changed to a forward motion, the joint must necessarily lock on a lower check, $j$, or have shoulders in the joint to secure its strength in resisting the forward action of the wheel when locked or going downhill. Fig. 6 illustrates the action of the short piece A and rubber of Fig. 5. Fig. 7 shows the application of either of the devices to a pole on a two-horse carriage.

Whereas William Ellmaker, one of the parties hereto, did obtain Letters Patent for a self-acting brake bearing date October 22, 1861, in which a rod-spring and levered rubber are similarly employed. Experience has shown that the springs H require to be made so strong (to prevent locking the wheels when it is desirable to back) as to interfere with their ordinary use. This objection is remedied by means of the parts A (resting on the shafts or pole-supports S) being attached to the part B of the lever by a strong hinge, it being found preferable to place the jointed levers on top, as shown by Fig. 1; hence the springs H are not required to be stronger than is necessary to facilitate the action of the rod on the jointed lever.

Fig. 8 shows the step-staple, in which the lever-arm A, united by its joint to B, held by the pin or fulcrum $c$, which latter is affixed in the cross-piece or coupling of the shafts, as shown. The lower step, $b$, of the staple holds the lever in place and prevents rattling while driving forward. On going downhill the rubber is pressed against the wheel by the action of the rod and backing-strap in its eye I. The forward pressure of the wheels prevents the action of the joints and keeps the arm A B down, having action only on its pin $c$, and the wheels remain locked until the pressure is removed and the springs and rods again draw the levers into the lower step, $b$. In backing, the spring-rods force the rubbers against the wheels. The reverse motion carries the rubbers up and the jointed lever-arm into the upper step, $a$, clearing the wheels, and held by the continued action of backing against the rear portion of the staples. When the backward pressure is withdrawn, the rubber and its hinged arm drop in place upon the shaft, and, as before stated, again to be lodged in the lower step, $b$. The staple G on the shaft is also elongated, in order to allow the raising of the rod when backing, so as to accommodate its play with the lever-arm A. This arrangement is truly self-acting, and admirably efficient and highly desirable, and deemed an improvement of the greatest utility.

We do not claim the rod-spring and lever, as claimed already in the Letters Patent referred to, without joints.

What we claim as our joint improvement, and desire to secure by Letters Patent, is—

The arrangement of the jointed lever A B, the step-staple $a\ b$, and jointed rod F, combined and operated substantially as herein set forth, for the purpose specified.

WM. ELLMAKER.
CHRISTIAN HURST.

Witnesses:
C. S. HOFFMAN,
E. G. GROFF.